(12) United States Patent
Florek et al.

(10) Patent No.: US 7,215,422 B2
(45) Date of Patent: May 8, 2007

(54) ASSEMBLY AND METHOD FOR WAVELENGTH CALIBRATION IN AN ECHELLE SPECTROMETER

(75) Inventors: Stefan Florek, Berlin (DE); Helmut Becker-Ross, Berlin (DE); Uwe Heitmann, Berlin (DE)

(73) Assignees: Gesellschaft zur Förderung der Analytischen Wissenschaften e.V., Dortmund (DE); Gesellschaft zur Förderung angewandter Optik, Optoelektronik, Quantenelektronik und Spektroskonie e. V., Berlin (DE)

( * ) Notice: Subject to any disclaimer, the term of this patent is extended or adjusted under 35 U.S.C. 154(b) by 394 days.

(21) Appl. No.: 10/503,636

(22) PCT Filed: Jan. 28, 2003

(86) PCT No.: PCT/EP03/00832

§ 371 (c)(1),
(2), (4) Date: Aug. 5, 2004

(87) PCT Pub. No.: WO03/067204

PCT Pub. Date: Aug. 14, 2003

(65) Prior Publication Data

US 2005/0157293 A1    Jul. 21, 2005

(30) Foreign Application Priority Data

Feb. 7, 2002    (DE) ............................... 102 05 142

(51) Int. Cl.
*G01J 3/28* (2006.01)
(52) U.S. Cl. ........................ 356/328; 356/334
(58) Field of Classification Search .............. 356/328, 356/305, 334
See application file for complete search history.

(56) References Cited

U.S. PATENT DOCUMENTS

| | | | |
|---|---|---|---|
| 3,748,040 A | | 7/1973 | Hawes |
| 4,025,196 A | | 5/1977 | Chupp et al. |
| 4,697,924 A | * | 10/1987 | Akiyama ............... 356/333 |
| 5,285,255 A | * | 2/1994 | Baranne et al. ........ 356/328 |
| 5,424,825 A | * | 6/1995 | Delhaye et al. ........ 356/318 |
| 5,448,351 A | * | 9/1995 | Florek et al. ........... 356/334 |
| 5,777,733 A | * | 7/1998 | Radziuk ................. 356/328 |

FOREIGN PATENT DOCUMENTS

| | | |
|---|---|---|
| DE | 33 26 868 | 4/1984 |
| DE | 41 18 760 | 12/1992 |
| DE | 195 32 611 | 7/1996 |
| DE | 195 45 178 | 6/1997 |
| DE | 198 33 356 | 1/2000 |

* cited by examiner

Primary Examiner—Gregory J. Toatley, Jr.
Assistant Examiner—Kara Geisel
(74) Attorney, Agent, or Firm—James Creighton Wray

(57) ABSTRACT

A spectrometer assembly (10) is disclosed. The assembly includes a light source (11) with a continuous spectrum. A pre-monochromator (2) generates a spectrum with a relatively small linear dispersion from which a spectral portion is selectable, the spectral bandwidth of the spectral portion being smaller than or equal to the bandwidth of the free spectral range of the order in the echelle spectrum. The centre wavelength of the selected spectral interval is measurable with maximum blaze efficiency. The assembly also includes an echelle spectrometer (4) with means for wavelength calibration, an entrance slit (21) at the pre-monochromator (2), an intermediate slit assembly (50) with an intermediate slit (3) and a spatially resolving light detector (5) in the exit plane of the spectrometer for the detection of wavelength spectra.

13 Claims, 3 Drawing Sheets

ASSEMBLY AND METHOD FOR WAVELENGTH CALIBRATION IN AN ECHELLE SPECTROMETER

This application claims the benefit of German Application No. 102 05 142.9 filed Feb. 7, 2002 and PCT/EP03/00832 filed Jan. 28, 2003.

BACKGROUND OF THE INVENTION

1. Technical Field

The invention relates to a spectrometer. Furthermore, the invention relates to a method for the wavelength calibration of echelle spectrometers.

Echelle spectrometers are spectrometers operating wi have a high angular dispersion, i.e. the ability to angularly separate closly proximate wavelengths. This has the advantage of a high resolution and yet small dimensions of the assembly. Therefore, echelle gratings are particularity suitable for high resolution spectroscopy, such as atomic absorption spectroscopy with continuous light sources. A spectrometer with an echelle grating normally operates in very high diffraction orders. Typical values are $20^{th}$ to $150^{th}$ order. The free spectral range in each order is comparatively small.

In order to avoid spectral overlapping of different diffraction orders in the exit plane of the spectrometer, echelle spectrometers are used in combination with an internal separation of the orders which is perpendicular to the direction of the echelle dispersion and leading to two-dimensional spectra. The use of echelle gratings in combination with a pre-monochramator for the separation of the orders is also known as a so called double echelle spectrometer assembly. The radiation is specrally pre-selected for example by means of a prism. Only the radiation from a limited spectral range essentially corresponding to one order enteres the echelle spectrometer. The generated echelle spectrum has a linear spectral form. Diffraction gratings or prisms are used as dispersing optical elements for the selection of the order with a pre-monochromator. The directions of the dispersion of the pre-monochromator and the echelle grating are parallel to each other.

For most applications it is necessary to calibrate the spectrometer. A wavelength is allocated to each geometric position in the exit plane of the spectrometer. The calibration can vary due to temperature changes, vibrations or other mechanical changes. In this case it may be necessary to re-calibrate the device.

2. Prior Art

From the DE 41 18 760 A1 a double spectrometer assembly is known having a fluid prism with variable prism angle which generates a spectrum with a low, adjustable dispersion. The spectrum is imaged on an intermediate slit simultaneously forming the entrance slit, i.e. the field stop for the following echelle spectrometer. The intermediate slit cuts out a partial spectrum from the entire spectrum of the light source to be measured, the spectral band width of such partial spectrum being at least smaller than the band width of the corresponding diffraction order of the echelle grating. Such an assembly operates with a small intermediate slit with constant width. The width of the intermediate slit is selected similar to the width of a picture element of the detector (pixel). The width of the entrance slit is comparatively large. The selection of the spectral band width of the light entering through the intermediate slit is effected by varying the linear dispersion in such a way that the prism angle is adjusted accordingly. The position of the wavelength of the portion of the spectrum is adjusted by rotating the prism. The position of the portion of the spectrum on the detector of the echelle spectrometer is adjusted by rotating the echelle grating. The precision of the adjustment of the wavelength position is determined by the precision of the mechanical adjustment of the angle of the echelle grating and the prism of the pre-monochromator, respectively.

From DE 195 45 178 A1, a spectrometer assembly is known consisting of an echelle spectrometer and a preceding prism spectrometer for the separation of the orders, the assembly using the Neon spectrum of a low pressure discharge lamp as a line source for the wavelength calibration of the echelle spectrometer. The light from the line source enters the echelle spectrometer bypassing the prism spectrometer through an auxiliary slit in the plane of the intermediate slit and is detected with additional detector elements at the light detector. In such an assembly the widths of the auxiliary slit and the intermediate slit are constant, have the same width and they are smaller than the entrance slit of the pre-monochromator. The intermediate slit forms the field stop for the double spectrometer assembly in a known way. The width of the entrance slit of the described assembly can be changed in steps. Using a fixed prism angle the entrance slit serves as the spectral limitation of the light beam entering the echelle spectrometer. The light entering through the auxiliary slit without pre-dispersion for the wavelength calibration generates a characteristic pattern of spectral lines on the detector. Not all the lines belong to one diffraction order of the Echelle grating, but represent the superposition of the different diffraction orders of the grating. Each line exactly represents one pair of values for the incident and diffraction angle at the grating. With a sufficient line density at least on line is imaged on the reference detector for each position of the grating. By mechanically coupling of the detectors on a common silicon chip a wavelength calibration of the measuring detector can be performed for each measuring wavelength using the position of the reference line with the second, parallelly arranged reference detector. The accuracy of the adjustment of the wavelength position is only determined by the measuring accuracy of the measurement of the reference spectrum, apart from the various imaging errors of the measurement and reference spectra. Thereby, it is now independent from the accuracy of the mechanical adjustment of the Echelle grating.

It is a disadvantage of the known assemblies, that each detector element of the light receiving detector is illuminated by the light from a different position of the entrance slit which is significantly wider than the intermediate slit. Thereby a measuring error can be generated, when using the double spectrometer assembly especially for the investigation of light sources with an inhomogeneous light density distribution.

Furthermore, the accuracy of the adjustment of the wavelength position of the wavelength range selected by means of the pre-monochromator is completely dominated by the accuracy of the mechanical adjustment of the dispersing element used for the pre-monochromator. Furthermore, the line density of the calibrating light source often is not sufficient with very high linear dispersion of the echelle spectrometer to image at least one calibration line on the detector for each grating position.

DISCLOSURE OF THE INVENTION

It is an object of the invention to provide a double spectrometer assembly of the above mentioned kind, where a complete wavelength calibration for the entire assembly is possible by controlled rotation of the echelle grating and the dispersing element of the pre-monochromator. Furthermore, it is an object of the invention to provide a spectrometer, which can be calibrated, wherein the relative distribution of the spectral intensity values within the selected wavelength range is insensitive to intensity changes in the light source with inhomogeneous light density distribution.

With the use of the narrow entrance slit and a wide intermediate slit the entrance slit forms the field stop for the entire optical assembly. For different wavelengths, the same position of the light source is imaged on each detector pixel at all times. The image of the entrance slit can move due to, for example, thermal and mechanical influences. Due to the possibiltiy of imaging this image as a wavelength range of a continuous spectrum on the detector and adjusting the pre-monochromator always in the same position on the detector this changing movement can be compensated quasi-online. A highly precisely adjustable assembly is generated which provides correct spectral intensity values which are independent of geometric changes in the light source and which are, to a large extent, independent of thermal and mechanical influences. The continuous spectrum ensures that a positionable intensity peak or a positionable intensity profile is present in each order and for each grating position. No ideal continuum is, however, required, in which exactly the same intensity is present at all wavelengths. It is sufficient if the light is emitted at all relevant wavelengths. Such light sources are, for example, noble gas high pressure short arc lamps.

The device is particularly suitable for applications using a light source with a continuous spectrum anyway. These are, amongst others, atomic absorption spectrometers, wherein the correction of background interference is effected with continuous light sources or atomic absorption spectrometers with a continuous light source as a measuring light source. However, the continuous light source can also be entered into the optical path exclusively for the calibration of the assembly.

The width of the entrance slit is preferably selected such, that the width of its image on the detector is equal to the width of a detector element. Thereby a good compromise between maximum resolution and maximum light transmission is achieved. A reduction of the entrance slit width does not lead to an increase of the resolution. Enlargement would lead to higher light transmission, but, at the same time, would also lead to decreasing resolution.

Preferably the width of the intermediate slit is adjustable. Then the intensity profile on the detector can be adjusted for each wavelength such that only the required spectral bandwidth is used for spectroscopic measurements and all other wavelengths are blocked. This has, amongst others, the advantage, that the stray light is reduced. For the calibration of the pre-monochromator by means of a continuous spectrum the measurement of the flancs of the intensity profile with minimum slit width can be used for the positioning.

In an embodiment of the invention the pre-monochromator comprises a prism. Quartz prisms in particular are very suitable for applications in the UV/VIS-spectral range due to their high transmissivity. In a further embodiment of the invention the spatially resolving detector is a CCD- or a PDA-detector.

In a particularity preferred embodiment of the invention the pre-monochromator is arranged in a Littrow arrangement. Thereby a compact arrangement with small imaging errors and high resolution can be achieved with only few components. Spacial requirements and costs are thereby reduced. The same applies to the arrangement of the echelle spectrometer.

Preferably the wavelength adjustment is effected by rotation of the respective dispersive elements. However, it is also possible to adjust the other optical components, such as mirrors or the detector.

In a particularity preferred embodiment of the invention the means for the wavelength calibration of the echelle spectrometer comprise a light source with a line spectrum, emitting light which can be imaged on the intermediate slit and means are provided for adjusting a line detected with the detector in a reference position. This kind of calibration enables a wavelength adjustment in such a way that the remaining error is determined by the measuring error of the detector only and not by the error of the mechanical adjustment of the rotation of the grating. The line spectrum of the calibration light source can occur in a wavelength range which is at a large distance from the wavelength to be measured, i.e. in a diffraction order, which is substantially different from the order of the measuring wavelength, as long as the diffraction angles at the echelle grating are sufficiently close to each other. By computing the diffraction angle of the measuring wavelength and the reference wavelength in the different diffraction orders the corresponding angular position of the grating can be adjusted in a very simple way.

In case that all overlapping lines of the calibration light source are too distant from each other for all diffraction orders of the echelle grating, in a further embodiment of the invention one or more additional calibrating slits can be provided next to the intermediate slit in the direction of dispersion of the echelle grating and one ore more light sources with line spectra for illuminating such calibrating slits can be provided. In this case the line spectrum shifted in the direction of dispersion occurs several times at the detector. Lines of the same wavelength are shifted by the geometric distance of their respective slit relative to the intermediate slit with respect to such line, which is generated by the intermediate slit itself. The line density generated thereby on the detector enables the reduction of the measuring error with the wavelength calibration. The real geometric distances between the slit openings can be measured exactly by means of the detector for slit images of the same wavelength.

Preferably the prism and the echelle grating are arranged in such a way that drifts of the image of the entrance slit in the intermediate slit and of the image of the entrance slit on the detector in the common dispersion direction of the prism pre-monochromator and echelle spectrometer caused by changes of the prism- and grating dispersion due to temperature changes occur in opposite directions. With increasing environmental temperature and the thermal extension of the grating carrier resulting therefrom the grating constant increases. Thereby the diffraction angle for a monochromatic wavelength decreases for a constant incident angle at the echelle grating. The corresponding spectral line is shifted towards smaller wavelengths on the detector.

The environmental temperature also influences the diffraction constant of the prism material. Thereby the monochromatic image of the entrance slit in the intermediate slit is shifted. The echelle grating is illuminated with the incident angle of the wavelenght shifted in such a way. A larger incident angle at the echelle grating results in a smaller diffraction angle. With a suitable positioning of the grating, prism and—if present—optical components changing the dispersion direction (mirrors) both thermal effects can be made to operate in opposite directions and, as a result, only cause a minimal drift of the spectrum on the detector. Thereby higher adjustment accuracy of the pre-positioning of the wavelength positions can be achieved. Furthermore the required repetition rate of wavelength calibrations can be reduced.

The invention is described below in greater detail with reference to the accompanying drawings.

DESCRIPTION OF THE EMBODIMENT

Figure 1:
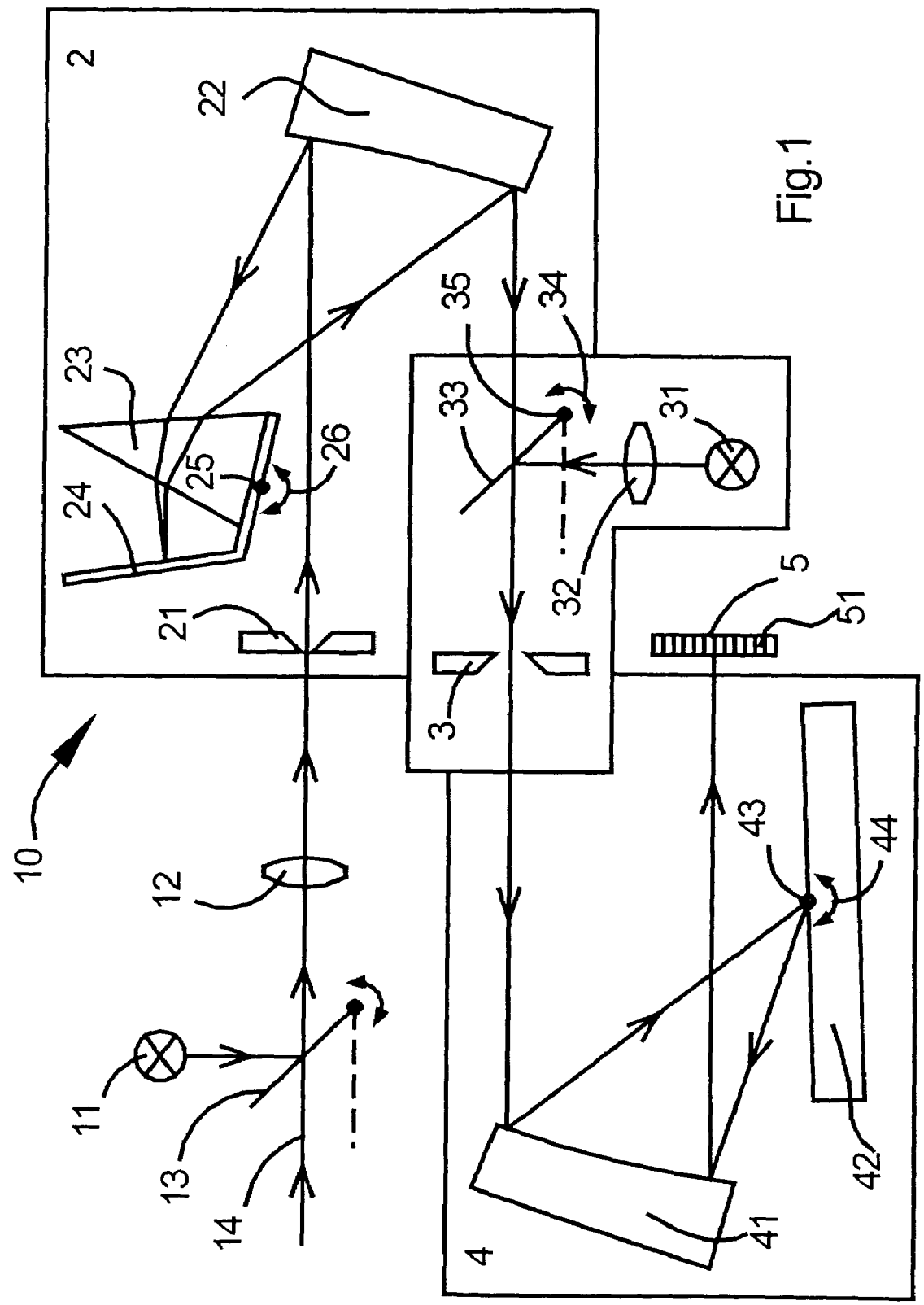
FIG. 1 is a schematic representation of an echelle spectrometer with pre-monochromator.

In FIG. 1 numeral 10 denotes a spectrometer assembly. The assembly 10 comprises a pre-monochromator 2 and an echelle spectrometer 4. Numeral 21 denotes the entrance slit of the pre-monochromator 2. It is illuminated by a light source 11 with a continuous wavelength spectrum for calibration. Such a light source is for example a Xenon high pressure short arc lamp. For this purpose a rotatable mirror 13 and a lens 12 are arranged in the measuring optical path 14 as an imaging element. The entrance slit 21 has a fixed slit width of 25 microns, corresponding to the width of a detector element 51 of a CCD-linear array 5 used as a spatially resolving light detector. The entrance slit 21 forms the field stop for the double spectrometer assembly and defines the width of a monochromatic beam at the location of the detector 5.

The incident divergent light beam is deflected and collimated by a paraboloidal mirror 22. The parallel light passes through a prism 23. Thereby the light is dispersed for a first time. After the reflection at a plane mirror 24 which is arranged behind the prism 23, the radiation passes through the prism 23 for a second time. Thereby almost a doubling of the dispersion is achieved. The light dispersed by the prism to a degree depending on the wavelength is then focused on the intermediate slit 3 by the mirror 22. Due to the double passage through the prism, maximum angular dispersion can be generated. This is particularly important in the spectral range of long wavelengths over 600 nm to cut out sufficiently small spectral intervals from the continuous spectrum of the light source 11 at the intermediate slit 3. The positioning of the wavelength of the spectral range at the position of the intermediate slit 3 can be achieved by electromotoric rotation of the prism 23 and the plane mirror 24 about a common axis 25. This is indicated by an arrow 26.

A portion of the light with a well-defined reduced spectral bandwidth enters the echelle spectrometer 4 through the intermediate slit 3. Therein, the divergent beam hits the paraboloidal mirror 41 and is collimated. The paraboloidal mirror 41 reflects the parallel light beam in the direction of an echelle grating 42. After diffraction at the echelle grating 42 the light is again reflected by the paraboloidal mirror 41 and focused on the CCD-linear array 5. The latter converts the spectral intensity distribution to electric signals which afterwards are digitised and transferred for further data processing. For the selection of the wavelength, the echelle grating 42 can be rotated about a rotational axis 43 extending parallel to the grooves of the grating. This is indicated by a double arrow 44.

The grating and the prism are mounted, in this assembly, in such a way, that the thermally caused wavelength drifts in the pre-monochromator and the echelle spectrometer occur in opposite directions.

The intermediate slit 3 has two moveable slit jaws for adjusting the width of the intermediate slit. With the minimum adjustable width, the slit jaws touch a pin having a well defined diameter. Thereby, the slit jaws cannot approach each other any further and the slit width is adjusted to a reproducible value at a well-defined position. The minimum width is larger than the width of the detector elements and the entrance slit.

Figure 2:
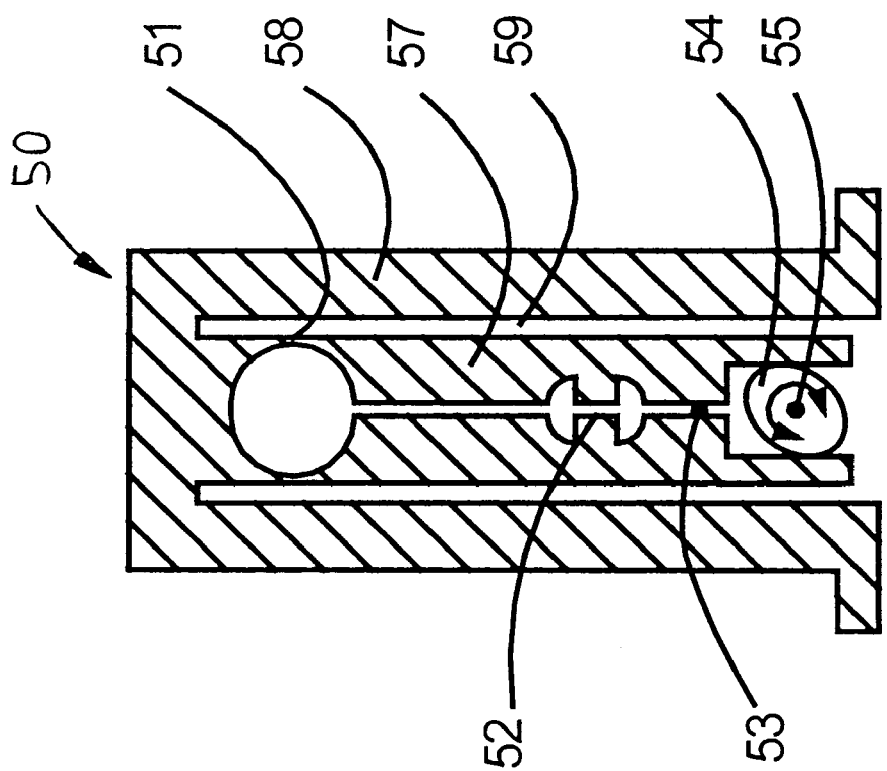
FIG. 2 shows an intermediate slit assembly in detail.

FIG. 2 shows an embodiment of the mechanical assembly 50 of the intermediate slit with adjustable slit width in detail. The intermediate slit is formed by two slit edges 52. The slit edges 52 are mounted on a flat slit edge carrier 57, respectively, which is connected to an essentially rectangular base body 58. The base body 58 is fixed to a base plate (not shown) of the spectrometer assembly. The connecting portion between the carrier 57 and the base body 58 is tapered and forms the spring joint 51 of a bending spring.

The carriers 57 are cut out at the lower end in FIG. 2. An eccentric disc 54 which is controlled by a stepper motor is arranged in the space formed thereby. If the eccentric disc 54 is rotated about an axis of rotation 55, both carriers 57 are pushed apart against the force of the bending spring 51 or approach each other again. Therefore, the slit edges are not exactly parallel to each other, but perform a scissors-like movement. However, the influence on the limitation of the bandwidth generated thereby is negligible especially for small slit heights of, for example, 1 mm.

In order to provide sufficient space for movement of the carriers 57 within the base body 58 spaces 59 are provided therebetween. Furthermore a pin 53 is provided defining the minimum slit width.

Figure 3:
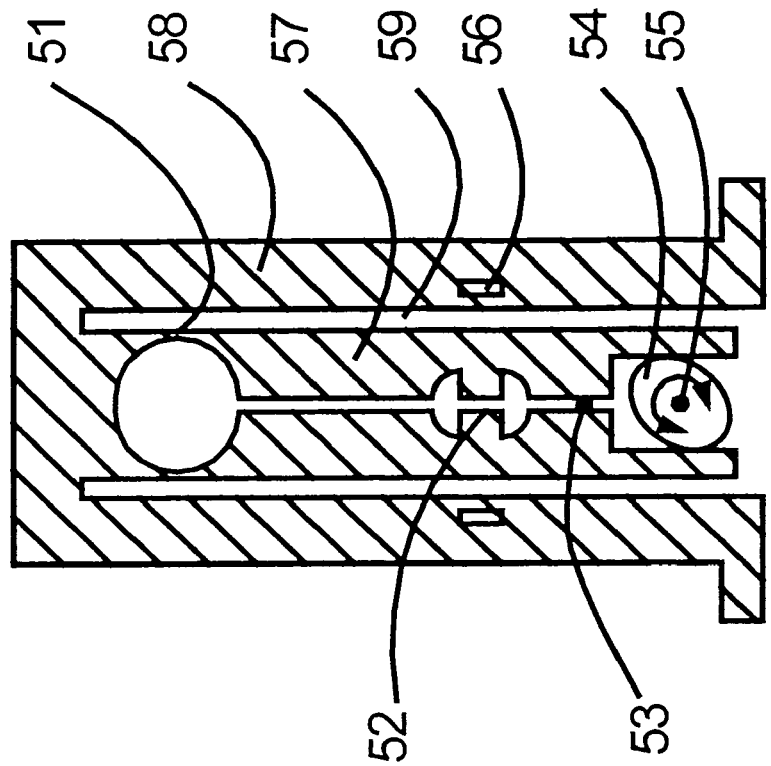
FIG. 3 shows the intermediate slit assembly of FIG. 2 with additional calibration slits.

A further embodiment of the intermediate slit assembly 50 of the same kind is shown in FIG. 3. There, on each side of the base body 58, fixed auxiliary slits 56 are additionally provided. The auxiliary slits 56 serve as additional calibration slits for increasing the line density at the detector when the echelle spectrometer is calibrated.

Overall, the real image of the light source 11 in the entrance slit is, at first, exactly imaged on the intermediate slit 3 by the optical system of the pre-monochromator 2 and, subsequently, it is imaged on the detector by the optical system of the echelle spectrometer (FIG. 1).

By rotating a rotating mirror 33 into the measuring optical path the light of a neon lamp can be focused by means of an imaging element 32 in the plane of the intermediate slit 3, dispersed in the echelle spectrometer, without preceding separation of the orders, and detected as a spectrum on the detector 5.

The described assembly operates as follows for the wavelength calibration:

At first, the intermediate slit 3 is adjusted to a width which is slightly wider than the width of the entrance slit, for example to 30 microns. Then the mirror 33 is rotated about the axis 34 into the light path. Thereby the light from the light source 11 with the continuous spectrum is blocked and the light from the light source 31 with a line spectrum is passed, through the intermediate slit, into the echelle spectrometer.

The echelle grating 42 is roughly positioned by rotating about the axis 43. This means, that a reference line selected for the calibration of a desired measuring wavelength can be unambiguously identified on the linear detector array. This reference line is selected depending on the measuring wavelength from a wavelength catalogue of known reference lines of the line source. The reached position of the reference line on the linear detector array is determined. Then this position is compared with a previously calculated desired position. The desired position is calculated from the difference between the calculated diffraction angle of the measuring wavelength and the reference line.

A deviation of the position of the reference line from its desired position is corrected by a fine correction of the angular position of the echelle grating and, thereby, also the measuring wavelength is adjusted to its desired position. This means that, by rotating the grating, the line is shifted to its position. The echelle spectrometer is completely calibrated after this step. A wavelength can be unambiguously and very precisely allocated to each detector element, when light of a known order enters the spectrometer.

For the calibration of the prism arranged in the pre-monochromator the entrance slit is again illuminated by the continuum light source. The mirror 33 is again rotated out of the light path and the line spectrum is blocked. Here also the prism is first only roughly positioned. The positioning is effected in a way to ensure that the deviation from the desired measuring wavelength is smaller than the section, detected by the linear detector array, of the free spectral range of the order in the echelle spectrum in which the measuring wavelength is measured with the maximum blaze efficiency. In other words: The "correct" order is coupled into the echelle spectrometer. In this case the spectral portion can unambiguously be identified on the linear detector array.

As the intermediate slit is adjusted to a small width, the spectral interval appears as a peak-shaped profile enabling the easy determination of a maximum, a half-width value or the like. It is also possible to calibrate with a wider intermediate slit. In this case the spectral interval appears with a trapezoidal intensity profile, allowing the definition of the position for example as the middle of the half-width value. The spectral interval is selected by the intermediate slit and dispersed at the echelle grating.

Figure 4A:
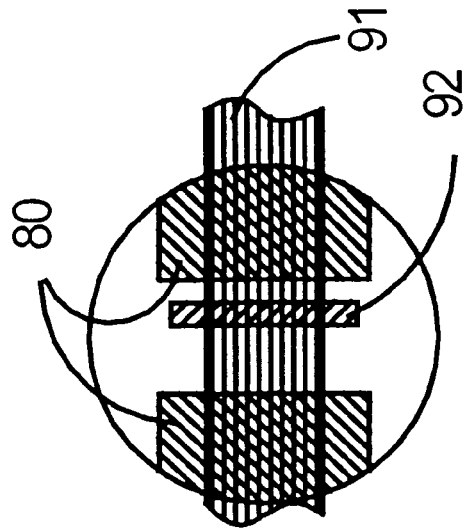
FIG. 4a shows a portion with the intermediate slit and the calibrated position of a monochromatic image of the entrance slit.

FIG. 4*a* shows, at a heavily enlarged scale, the situation at the intermediate slit 3 of the pre-monochromator 2 in FIG. 1. The case of the ideal adjustment of the pre-monochromator is shown, after the position of the echelle grating 42 (FIG. 1) has been exactly adjusted by means of the internal line source 31.

The measuring wavelength represented by the emission line 82 is positioned exactly in the middle of the intermediate slit with the slit edges 80. The width of the intermediate slit determined by the distance between the slit edges 80 is selected such that, for the spectral bandwidth of the selected spectral interval its geometric width after the dispersion and imaging on the linear detector array 5 in the echelle spectrometer 4 is smaller than the width of the detector. In the present case the width of the intermediate slit is between 0,05 and 0,1 mm. The width of the linear detector array is about 10 mm.

Figure 4B:
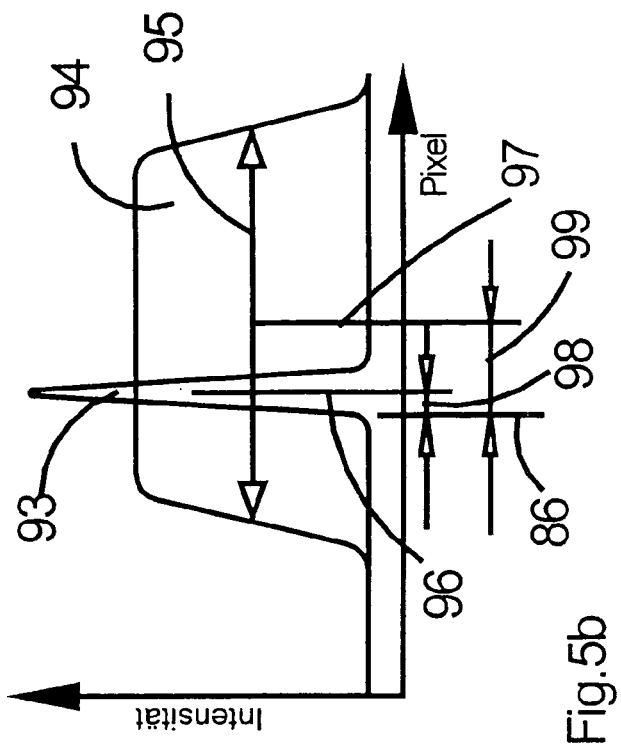
FIG. 4b shows the intensity distribution of a light source with continuous spectrum and a light source with a line spectrum in a reference position at the detector.

FIG. 4*b* shows the resulting intensity distributions on the linear detector array 5 for the cases of the measurement of the emission line 82 and a continuum 81 according to FIG. 4*a*. The intensity distribution 83 of the emission line 82 is symmetrical to its desired position 86 after the calibration of the echelle spectrometer has been effected. The centre of the half-width value 85 of the essentially trapezoidal intensity distribution 84 for a spectral portion selected from a continuum is exactly equal to the desired position 86 of the measuring wavelength after calibration of the pre-monochromator has been performed.

Figure 5A:
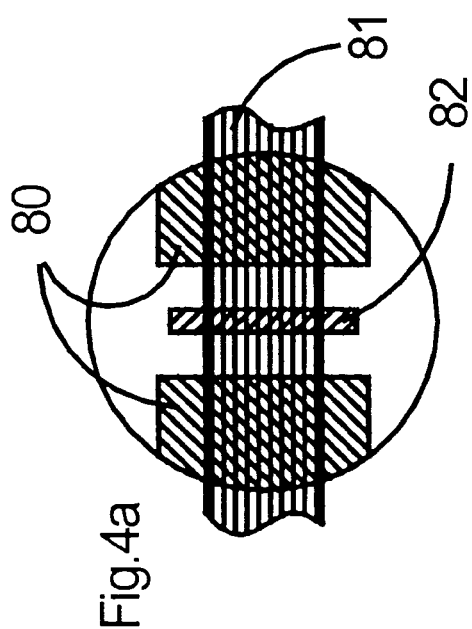
FIG. 5a is a representation of FIG. 4a in a non-calibrated position

Due to temperature variations or other interference this situation can change. Such a disturbed situation is shown in FIG. 5. FIG. 5*a* shows, at a heavily enlarged scale, the intermediate slit in the case, where the spectrum of the pre-monochromator is shifted with respect to the intermediate slit. The measuring wavelength, represented by the shifted emission line 92, is no longer located in the middle between the slit edges 80, i.e. also the position of the continuum 91 is shifted by the same amount.

Figure 5B:
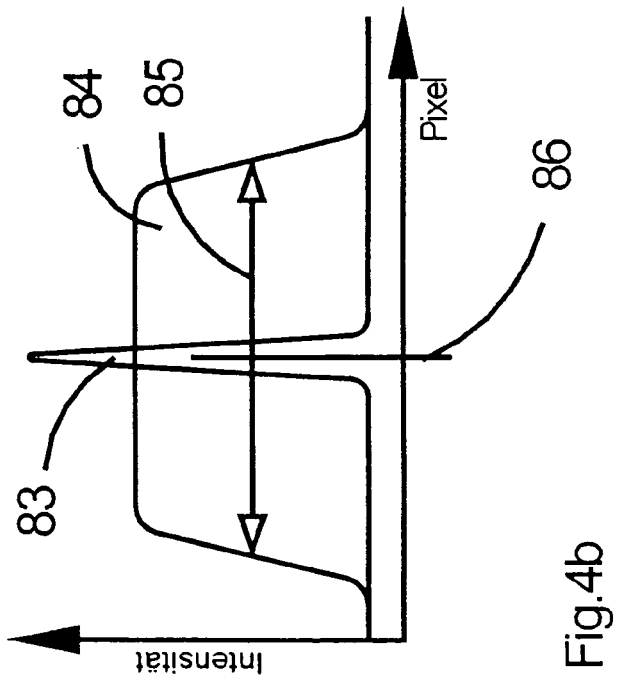
FIG. 5b is a representation of FIG. 4b in a non-calibrated position

FIG. 5*b* shows the associated intensity values on the linear detector array for the cases of measuring the emission line 92 and the continuum 91. The centre position of the intensity distribution 93 of the emission line 92 is shifted on the linear detector array by about the same amount 98 from the desired position 86 as the emission line 92 is shifted from the centre between the slit edges 80 of the intermediate slit. However, the shift 99 of the centre of the half-width value 95 of the trapezoidal intensity distribution 94 of the spectral interval selected from a continuum is considerably larger, because the spectral interval selected by the intermediate slit, due to the echelle dispersion, appears to be heavily stretched on the linear detector array. This is the case because the echelle dispersion is considerably higher than the dispersion of the pre-monochromator. The image of a monochromatic emission line, however, is not broadened very much by the echelle dispersion.

A shift of such an intermediate image generates completely different results with respect to the intensity distribution on the linear detector array, if the measuring spectrum is either a line spectrum or a continuum. The much larger shift of the half-width value centre of the trapezoidal intensity profile of the continuum as compared to the line shift, which can be explained by the relation between the linear dispersions of the echelle spectrometer and the pre-monochromator, enables the highly accurate positioning of the measuring wavelength in the intermediate slit using the continuum measurement.

The assembly is particularly suitable for measuring methods which make use of a light source emitting a continuous spectrum anyway, for example atomic absorption spectroscopy with continuum sources (CSAAS) or with atomic absorption spectroscopy with a background compensation by means of a deuterium lamp.

The invention claimed is:

1. A spectrometer assembly comprising
   a light source emitting light with a continuous wavelength spectrum,
   pre-monochromator means comprising an entrance slit,
   means for directing a light beam from said continuous spectrum light source onto said entrance slit of said pre-monochromator means,
   echelle spectrometer means comprising a blazed diffraction grating with grooves and defining an exit plane, in which said echelle spectrometer means in operation generates overlapping echelle spectra of different orders, each of said spectra having a free spectral range with a bandwidth, said blazed diffraction grating defining an order of an echelle spectrum, the center wavelength of which has a maximum blaze effectiveness, said pre-monochromator means further comprising means for spectrally dispersing light from said light beam from said continuous spectrum light source with a degree of linear dispersion and means for selecting, from said dispersed light, a spectral interval having a bandwidth, which is not larger than said bandwidth of said free spectral range of said maximum effectiveness spectrum order and has an intensity versus wavelength profile, said profile defining a wavelength characteristic of said profile, an intermediate slit assembly between said pre-monochromator means and said echelle spectrometer means, said intermediate slit means having a slit width and being arranged to form an exit slit of said pre-monochromator means and an entrance slit of said echelle spectrometer means, said pre-monochromator being adapted to generate a monochromatic image of said pre-monochromator entrance slit on said intermediate slit, said slit width of said intermediate slit assembly being larger than said monochromatic image of said pre-monochromator entrance slit, and spatially resolving detector means located in said exit plane for detecting said spectrum generated by said echelle spectrometer means and defining a reference position thereon, calibrating means for calibrating said pre-monochromator to bring said profile characteristic wavelength to coincidence with said reference position.

2. A spectrometer assembly as claimed in claim 1, wherein said slit width of said intermediate slit assembly is adjustable.

3. A spectrometer assembly as claimed in claim 1, wherein said light dispersing means of said pre-monochromator comprise a prism.

4. A spectrometer assembly as claimed in claim 1, wherein said spatially resolving detector is a CCD-detector.

5. A spectrometer assembly as claimed in claim 1, wherein said spatially resolving detector is a PDA-detector.

6. A spectrometer assembly as claimed in claim 1, wherein said light dispersing means comprise a Littrow arrangement.

7. A spectrometer assembly as claimed in claim 1, wherein said blazed diffraction grating of said echelle spectrometer is arranged in a Littrow arrangement.

8. A spectrometer assembly as claimed in claim 1, and further comprising: means for calibrating said echelle spectrometer, said calibrating means comprising a light source emitting a line spectrum with a reference line, means for focusing the light from said light source on said intermediate slit, whereby said echelle spectrum generated on said spatially resolving detector represents said line spectrum, said spatially resolving detector defining an echelle reference position thereon, and means for adjusting said echelle spectrometer to bring said reference line in said echelle spectrum to coincidence with said echelle reference position.

9. A spectrometer assembly as claimed in claim 8, wherein said means for adjusting said echelle spectrometer comprise means for rotating said grating about an axis extending parallel to said grooves of said grating.

10. A spectrometer assembly as claimed in claim 1, and further comprising at least one additional light source emitting a line spectrum with an additional reference line, at least one additional calibration slit next to said intermediate slit and associated with said at least one additional light source, means for focusing the light said at least one additional light source on said associated calibration slit, whereby said echelle spectrum generated on said spatially resolving detector represents said line spectrum, said spatially resolving detector defining an echelle reference position thereon, and means for adjusting said echelle spectrometer to bring said reference line in said echelle spectrum to coincidence with said echelle reference position.

11. A spectrometer assembly as claimed in claim 1, wherein said light dispersing means of said pre-monochromator means comprise a prism the direction of dispersion of said prism being identical with the direction of dispersion of said echelle spectrometer means, the dispersion of said prism being affected by temperature changes to cause a drift of said monochromatic image of said pre-monochromator entrance slit on said intermediate slit, said echelle spectrometer generating, as said echelle spectrum, a spectrally dispersed image of said pre-monochromator entrance slit in said exit plane, said image being affected by temperature changes to cause a drift of said image of said pre-monochromator entrance slit in said exit plane, said prism and said echelle grating being arranged to cause said drifts to substantially compensate each other.

12. A method of calibrating a spectrometer assembly with pre-monochromator means having an entrance slit, echelle spectrometer means, an intermediate slit therebetween, and a detector, comprising the steps of:

calibrating said echelle spectrometer means, illuminating said entrance slit with light having a continuous wavelength spectrum, adjusting the width of said intermediate slit to a value, with which a monochromatic real image of the entrance slit has a smaller width than the intermediate slit, detecting the position of the passed spectral band at said detector and adjusting said pre-monochromator means to position the passed spectral band at the detector at a desired position.

13. A method as claimed in claim 12, wherein said calibration of said echelle spectrometer means comprises the steps of:

irradiating said intermediate slit with light from a light source having a line spectrum, determining the position of at least one line of said line spectrum on said detector and comparing said position with at least one desired position, and adjusting said spectrometer to bring said at least one line on said detector into coincidence with said desired position.

* * * * *

UNITED STATES PATENT AND TRADEMARK OFFICE
CERTIFICATE OF CORRECTION

PATENT NO. : 7,215,422 B2  Page 1 of 1
APPLICATION NO. : 10/503636
DATED : May 8, 2007
INVENTOR(S) : Florek et al.

It is certified that error appears in the above-identified patent and that said Letters Patent is hereby corrected as shown below:

Title Page

Item (73), Assignees, should read:

>Gesellschaft zur Förderung der Analytischen Wissenschaften e.V., Dortmund (DE); Gesellschaft zur Förderung angewandter Optik, Optoelektronik, Quantenelektronik und Spektroskopie e.V., Berlin (DE)

Signed and Sealed this

Third Day of July, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,215,422 B2 | Page 1 of 1 |
| APPLICATION NO. | : 10/503636 | |
| DATED | : May 8, 2007 | |
| INVENTOR(S) | : Florek et al. | |

It is certified that error appears in the above-identified patent and that said Letters Patent is hereby corrected as shown below:

In Column 1, Line 15, delete "wi" and insert --with an echelle grating. These gratings--

Signed and Sealed this

Seventh Day of October, 2008

JON W. DUDAS
*Director of the United States Patent and Trademark Office*